(12) United States Patent
Stricevic et al.

(10) Patent No.: US 10,893,136 B2
(45) Date of Patent: Jan. 12, 2021

(54) SYSTEM AND METHOD FOR CONTROLLING IN-VEHICLE ELECTRONIC DEVICES

(71) Applicants: Boris Stricevic, Long Beach, CA (US); Zoran Maric, Long Beach, CA (US)

(72) Inventors: Boris Stricevic, Long Beach, CA (US); Zoran Maric, Long Beach, CA (US)

( * ) Notice: Subject to any disclaimer, the term of this patent is extended or adjusted under 35 U.S.C. 154(b) by 0 days.

(21) Appl. No.: 16/053,598

(22) Filed: Aug. 2, 2018

(65) Prior Publication Data

US 2019/0045049 A1    Feb. 7, 2019

Related U.S. Application Data

(60) Provisional application No. 62/540,153, filed on Aug. 2, 2017.

(51) Int. Cl.
| | | |
|---|---|---|
| *H04M 1/725* | (2006.01) | |
| *G07C 5/08* | (2006.01) | |
| *H04W 4/02* | (2018.01) | |
| *G07C 5/00* | (2006.01) | |

(52) U.S. Cl.
CPC ...... *H04M 1/72577* (2013.01); *G07C 5/0858* (2013.01); *G07C 5/008* (2013.01); *H04M 1/72566* (2013.01); *H04W 4/027* (2013.01)

(58) Field of Classification Search
CPC .......... H04M 1/72577; H04M 1/72566; G07C 5/0858; G07C 5/008; H04W 4/027

USPC .......... 340/439, 425.5, 426.1, 539.1, 539.11, 340/539.13
See application file for complete search history.

(56) References Cited

U.S. PATENT DOCUMENTS

| | | | |
|---|---|---|---|
| 8,145,199 | B2 | 3/2012 | Tadayon et al. |
| 8,290,480 | B2 | 10/2012 | Abramson et al. |
| 8,634,816 | B2 | 1/2014 | Xiao et al. |
| 8,750,853 | B2 | 6/2014 | Abramson et al. |
| 8,874,162 | B2 | 10/2014 | Schrader et al. |
| 9,078,116 | B2 | 7/2015 | Abramson et al. |
| 9,124,703 | B2 | 9/2015 | Tadayon et al. |
| 9,148,762 | B2 | 9/2015 | Taylor |
| 9,332,126 | B2 | 5/2016 | Tadayon et al. |
| 9,491,589 | B2 | 11/2016 | Schrader et al. |
| 9,646,427 | B2 | 5/2017 | Chen et al. |
| 2013/0304276 | A1* | 11/2013 | Flies ........................ G06F 17/00 701/1 |
| 2015/0054934 | A1* | 2/2015 | Haley ................. G06K 9/00845 348/78 |
| 2015/0341767 | A1* | 11/2015 | Nelson ................. G08B 25/016 455/404.2 |
| 2017/0006151 | A1* | 1/2017 | Doorandish ............ H04W 4/90 |
| 2018/0165936 | A1* | 6/2018 | Smith ................ G08B 21/0205 |

* cited by examiner

*Primary Examiner* — Daryl C Pope (74) *Attorney, Agent, or Firm* — Cohen IP Law Group, PC; Michael N. Cohen (57) ABSTRACT

A system for monitoring the status of a vehicle to obtain vehicle status data, and controlling an electronic device based on the vehicle status data is disclosed. The device that may monitor the status of the vehicle may be an hours of service system (HOS), and the electronic device may be a mobile device. The controlling of the mobile device may include restricting use of the devices functionalities.

20 Claims, 4 Drawing Sheets

SYSTEM AND METHOD FOR CONTROLLING IN-VEHICLE ELECTRONIC DEVICES

CROSS REFERENCE TO RELATED APPLICATIONS

This application claims priority from U.S. Provisional Patent Application Ser. No. 62/540,153, filed on Aug. 2, 2017, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

The current invention generally relates to a system for improving the safety of motor vehicles, and in particular, a system that monitors a vehicle's status and imposes appropriate restrictions on in-vehicle mobile device usage.

BACKGROUND

With the advent of mobile devices and their increased usage while driving, accidents due to distracted drivers have spiked. In fact, studies show that texting while driving is equivalent to driving under the influence of alcohol or drugs.

There are applications on the market to address this issue that allow a mobile phone to be locked or otherwise restricted from use while the user is driving, but these applications are mainly optional and can be disabled by the user. Thus, these applications do not guarantee that the mobile phone will not be used while the user is driving.

In addition, there are other applications that may sense movement of the vehicle and may in turn restrict use of the phone. But again, these systems are optional as well and may be disabled by the user and are therefore unreliable.

As such, there is a need for a new and innovative system that will restrict the use of unsafe applications and functionalities of a mobile device while the user is driving a vehicle. For example, there is a need for a system to determine that a vehicle is being driven and to restrict the usage of unsafe applications on the driver's mobile device in such a way that cannot be disabled until the vehicle is safely parked.

SUMMARY

In a first aspect of the invention, a system that restricts particular applications and functionalities of a mobile device that may be within a moving vehicle is described. The system may ascertain whether or not the vehicle is moving and if so, may impose the appropriate usage restrictions on the phone.

In another aspect of the invention, the system may include an Hours of Service (HOS) system that may interact with the vehicle's onboard computer system in order to determine if the vehicle is being driven. The system may also include a mobile app that may be installed on the driver's mobile phone that may be paired with and communicate with the HOS system.

In another aspect of the invention, the mobile app may control the mobile phone's apps and various functionalities and may restrict usage of particular apps or functionalities that may be deemed unsafe to use while the vehicle is being driven.

In another aspect of the invention, the mobile app may receive information from the HOS system regarding the movement of the vehicle and may make the determination regarding what mobile phone apps and functions should be restricted. The app may include safety protocols stored within the app that may be used in making the determinations.

In another aspect of the invention, the HOS system may receive information from the vehicle's onboard computer regarding the movement of the vehicle and may make the determination regarding what mobile phone apps and functions should be restricted. The HOS system may include safety protocols stored within the HOS system that may be used in making the determinations. The determinations may then be communicated to the mobile phone and the mobile phone may impose the restrictions.

In yet another aspect of the invention, the safety protocols within the mobile app or the HOS system used to make determinations regarding the restrictions of the mobile phones apps and functionalities may be hard wired or may be editable.

In another aspect of the invention, apps and functionalities on the mobile device may be mirrored to the interface of the HOS system so that the user may control and interact with the apps and functionalities of the mobile phone through the HOS system interface. In one example, the HOS interface may be a touch screen device that the user can utilize.

In another aspect of the invention, the system may not require the HOS system to interact with the vehicle's onboard computer system to get the movement status of the vehicle, but may instead rely on the sensors within the mobile device to make this determination. These sensors may include accelerometer or other motion sensing sensors.

In another aspect of the invention, the system may monitor the driver's driving activities and may send alerts to authorities (such as the trucking fleet management) regarding the driver's unsafe driving behavior.

In another aspect of the invention, the system may include a backend system that may communicate with the various systems, assemblies, elements, mechanisms and components of the system 10.

Other aspects of the invention are discussed herein.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE PRESENTLY PREFERRED EMBODIMENTS

The following detailed description is not intended to limit the current invention. Alternate embodiments and variations of the subject matter described herein will be apparent to those skilled in the art.

The term "mechanism," as used herein, refers to any device(s), process(es), service(s), or combination thereof. A mechanism may be implemented in hardware, software, firmware, using a special-purpose device, or any combination thereof. A mechanism may be mechanical or electrical or a combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

The system 10 of the current invention is now described with reference to the figures. Where the same or similar components appear in more than one figure, they are identified by the same or similar reference numerals.

In general, the system 10 may monitor and control the usage of electronic devices under specific conditions. In one preferred implementation, the system 10 may restrict individuals from using particular functionalities on his/her electronic device that may cause an unsafe condition given the location of the individual and the activity they may be involved with. For example, system 10 may restrict a driver of an automobile or truck from using particular native functions and/or applications that may be installed and running on their mobile device that may be distracting and therefore unsafe to use while driving. For the purposes of this specification, an electronic device and/or a mobile device may be a smartphone, a tablet computer, a pager, a laptop computer, a personal digital assistant, a digital music player, a gaming device or any other type of device that may require the attention of the person and therefore may be distracting.

In one exemplary embodiment hereof, the system 10 may ascertain a variety of properties such as movement, speed, engine health and other properties of the vehicle, and based on this information may deem if it may be safe or unsafe for the driver of the vehicle to utilize specific functionalities (e.g., mobile applications) of their mobile device (e.g., smartphone). Note that the vehicle may be an automobile, a truck, a boat, an airplane, a helicopter, a motorcycle, or any other type of vehicle. In the case where the vehicle status data shows the vehicle to be in motion, and a particular functionality of the mobile device is deemed to be distracting and therefore not safe to engage in while driving (such as texting), the system 10 may disable or otherwise restrict the particular functionality on the mobile device. However, in the case where the vehicle status data shows the vehicle to be parked, and therefore the use of a mobile device may be deemed safe, the system 10 may not restrict the use of the mobile device and the driver may be free to use it as they please.

Figure 1:
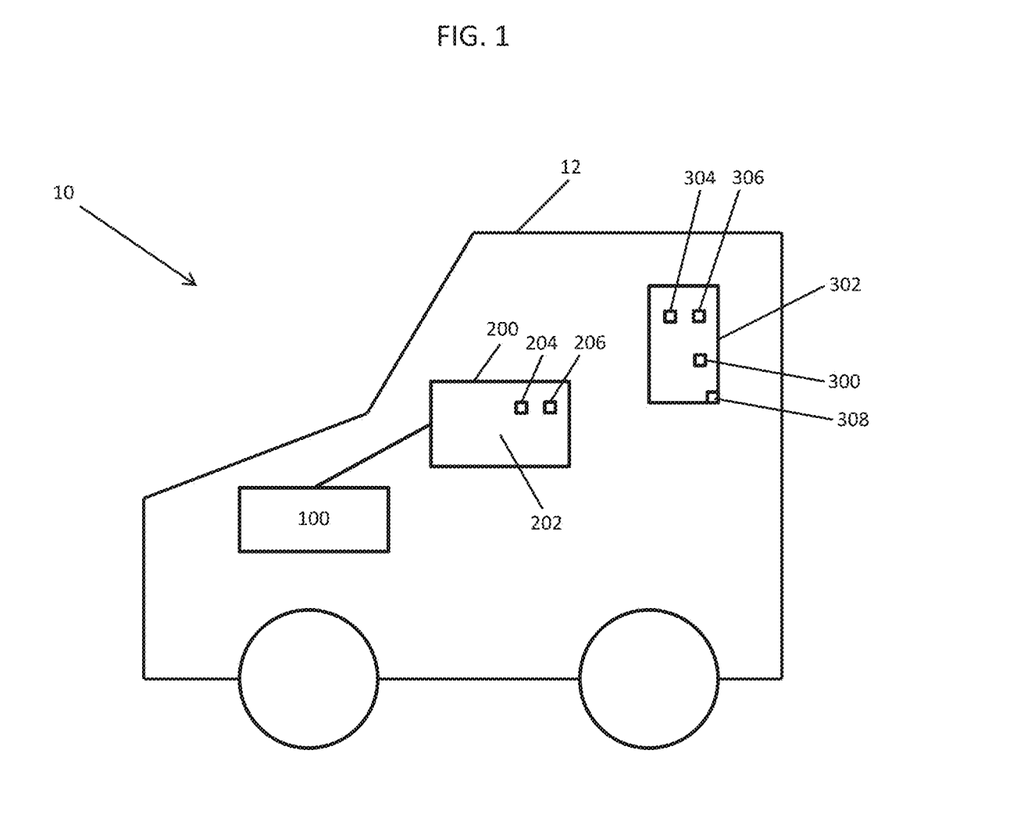
FIG. 1 shows aspects of a device control system according to exemplary embodiments hereof.

In one exemplary embodiment hereof as shown in FIG. 1, the system 10 may include a control system 200 that may be configured to communicate or otherwise interact with the vehicle's onboard computer assembly 100, a mobile application 300 (also referred to as a device application or mobile app) that may be installed onto the driver's mobile device 302 and configured to interact with the control system 200 and/or the onboard computer assembly 100, and a control platform 400 that may be configured to communicate with the onboard computer 100, the control system 200, the mobile app 300 and/or with any other element or component of the system 10 as necessary. Note that the app 300 is represented by an app icon on the touchscreen interface of the mobile device 302 and that the icon may launch the app 300 when activated (for example, by touching the icon on the touchscreen of the phone 302). The mobile device 302 may be a mobile phone, a smartphone, a tablet computer, a laptop computer, a personal digital assistant, a digital music player, a portable gaming device, or any other type of mobile device 302. The vehicle onboard computer assembly 100 may monitor the various systems, components and other elements of the vehicle 12 in real time to ensure that the vehicle 12 is operating within safe parameters and without any problems. These onboard computer assemblies 100 may typically be installed and configured with the vehicle 12 by the manufacturer for safety and maintenance purposes and may be standard operating equipment in today's automobiles and trucks. However, the onboard computer system 100 may be installed by any entity before, during or after the manufacturing of the vehicle 12.

In one exemplary embodiment hereof, the control system 200 may be an hours of service (HOS) system 200. For the purposes of this specification, the control system 200 may be referred to as an HOS system 200. However, it is understood that the control system 200 may include any type of control system, mechanism or device (hardware and software) that may perform the functionalities as described in this specification. It is also understood that the system 10 is not limited in any way by the type of control system 200 that may be implemented. The control system 200 may also include more than one control system 200 or a combination of control systems 200.

The HOS system 200 may be a system that may be required by law for many trucking and transportation fleets and assignments. The HOS system 200 may be a computer, microprocessor, or other type of data processing device and may include an interface 202 such as a touch screen, a keyboard, or other type of interface that the user may interact with. The HOS system 200 may be installed into the vehicle 12 to allow the driver to log their driving hours into the system 200 on a regular basis (daily, throughout the day, etc.) in order to demonstrate adherence to the regulations set forth by the Department of Transportation (DOT), for example, regulations regarding the maximum number of driving hours a driver may go between breaks and sleep. These regulations are meant to limit accidents that may be caused by driver drowsiness and/or falling asleep at the wheel.

The HOS system 200 may be installed in the vehicle 12 and synched with the onboard computer 100 using the J1939 protocol or other type of Controller Area Network (CAN) protocol or other type of protocol that may allow the HOS system 200 to interact with the onboard computer 100. It may be preferable that the HOS system 200 be hard-wired into the vehicle with the onboard computer 100 so that it may not be tampered with. However, other methods of connection may also be used such as wireless connectivity, Bluetooth technology, or other methods of connection. In addition, this may not be required.

In this way, with the HOS system 200 synched with the onboard computer 100 (e.g., via the J1939 protocol), the HOS system 200 may be configured to receive data from the onboard computer 100 pertaining to the vehicle 12. This data may include but is not limited to: the vehicle's road speed, the vehicle's location, the vehicle's gear selection, the engagement of the vehicle's parking brake, the engine health, the engine's temperature, the engine's oil pressure, and other characteristics and aspects of the vehicle that may be of importance. It can be seen that this data may be used by the HOS system 200 to determine if the vehicle 12 is in motion and the corresponding road speed of the vehicle, if the vehicle 12 is being operated properly and safely, if the vehicle 12 has any mechanical problems and other types of determinations. In this way, the HOS system 200 may be a monitoring device or mechanism that may monitor the overall status of the vehicle 12 via communicating with the onboard computer 100. The HOS 202 may also monitor the status of the vehicle 12 via communicating with the mobile application 300 as will be described in other sections.

In one exemplary embodiment hereof, the system 10 may include a mobile app 300 that may be downloaded and installed onto the driver's mobile device 302 and configured to interact with the HOS system 200. The mobile app 300 may operate on any mobile device operating system such as iOS, Android, Windows, Linux or any other operating system. In addition, the mobile app 300 and the device 302 may communicate with the HOS system 200 using Bluetooth, Wi-Fi, Near Field Communications (NFC) or other types of RF or microwave signals, by hard wiring, or by any other communication methods or protocols. In addition, the app 300 may have the ability to take partial or complete control of the phone 302 and its various functions and applications as required. In this way, if it is determined that the vehicle 12 is in motion and that it is therefore unsafe for the driver to utilize certain functions or apps on the phone 302, the app 300 may control the phone 302 to restrict the unsafe functions or apps. Note that the functionalities and/or apps on mobile phone 302 are depicted as app icons 304, 306 in FIG. 1. In this example, app icon 304 may represent an icon that when activated may launch a texting application on the mobile device 302, and app icon 306 may represent an icon that when activated may launch a voice call application on the mobile device 302. It is clear that these example apps 304, 306 are meant for demonstrational purposes and that other types of app icons representing other types of apps and phone functionalities may also be used with system 10.

In one preferred implementation of this type, the mobile app 300 may make the determination of whether particular functionality of the mobile phone 302 should be restricted. In this case, the app 300 may receive vehicle data from the HOS system 200 such as whether or not the vehicle 12 is in motion and if so at what road speed. The app 300 may then compare this information to a set of safety protocols within the app 300 that may instruct the app 300 to take a particular action depending on the data. For instance, the safety protocols may include a protocol stating that if the vehicle 12 is in motion, then the texting functionality of the phone 302 should be restricted and disabled. Thus, upon receiving data from the HOS system 200 that the vehicle 12 is in motion, the app 300 may disable the texting functionality of the phone 302 accordingly. In this example, the app 300 may also implement an auto-reply functionality that may automatically send a text to the sender of incoming text messages that may read "I am driving right now and will get back to you when I am safely parked" or similar. In this way, the driver can be assured that the sender of incoming texts may know that they are driving and that they will return the message once it is safe to do so. Note that while the mobile phone 302 may be paired with the HOS system 200, it may be preferable that the app 300 may not be disabled and the restrictions may not be overridden. This will be described in more detail in later sections.

In another example, the safety protocols within the app may include protocols regarding incoming phone calls. For instance, if the vehicle 12 is deemed to be in motion by the system 10 and an incoming phone call may be received by the phone 302, the system 10 (e.g., the app 300) may restrict the incoming call unless the system 10 also detects a hands-free device (e.g., an earpiece) configured with the phone 302 that may enable the driver to take the call without having to handle the phone and/or take their eyes off the road. In this case, if the driver has a Bluetooth earpiece that may be recognized by the app 300 as being in place, the app 300 may allow the phone call to be taken by the driver. Other types of hands-free devices may also be used and recognized by the app 300 such as in-cabin speakers and microphones, corded earpieces and microphones, or other types of hands-free devices or systems. However, if the app 300 does not recognize that any hands-free devices are in place and in use with the mobile phone 302, the incoming call may be sent directly to voicemail or may otherwise be restricted from being taken. The app 300 may also send an auto-respond text to the phone number of the incoming call as described above such that the caller may be notified that the driver will return their call upon stopping the vehicle. However, this may not be required.

In another example, if the driver wishes to make an outgoing call, the safety protocols within app 300 may allow such a call to be placed if the driver uses voice-activated calling to dial the number by voice, and a hands-free device to interact on the call. In his case, the mobile app 300 may recognize the driver's hands-free device, may disable manual dialing on the phone 302, may initiate the voice activation system for the driver to use (e.g., by dictating the phone number to call), and may allow the driver to place the call. However, if the driver does not have a hands-free device configured with his/her phone 302 and/or does not wish to place the call using the voice activated system, the app 300 may restrict the voice call functionality of the phone and may not allow the call to be made.

It is understood by a person of ordinary skill in the art, upon reading this specification, that the examples above are meant for demonstrational purposes and may be representative of different safety protocols within the app 300 and how the safety protocols may be implemented using vehicle data received by the HOS system 200. However, many other safety protocols may also be implemented by the system 10 and the examples given above do not limit the system 10 in any way.

In one exemplary embodiment hereof, the system 10 (e.g., the app 300) may not necessarily restrict particular operations of the phone 302 that may be deemed as necessary under any conditions. For example, the system 10 may allow the user to dial 911 in case of an emergency and this functionality may not be restricted even while driving. Other functionalities may also be unrestricted by the system 10.

In one exemplary embodiment hereof, the safety protocols within the HOS system 200 and/or the mobile app 300 may be tailored and/or customized to the particular driver, driving conditions or any other conditions or characteristics. For example, the safety protocols within each HOS system 200 and/or app 300 on each phone 322 may be tailored to particular drivers, particular types of vehicles, particular fleets of vehicles, particular geographic locations, particular weather conditions or for any other types of conditions, circumstances, characteristics or other information. For example, a driver with a flawless driving record may receive fewer restrictions compared to a driver known to have been involved in multiple accidents. In addition, certain trucking companies may impose safety protocols on their fleets of transportation vehicles that are stricter than other trucking companies.

The safety protocols may be hardwired within the HOS system 200 and/or the mobile app 300 (e.g., not editable) or may be variables that may be adjusted, edited or otherwise updated, either in real time or at other times. The protocols may be updated, edited or otherwise established by government regulations, by the management of the particular fleet of vehicles in which the system 10 may be implemented, by each individual driver, by other types of authorities or associations, or by other people or groups.

Figure 3:
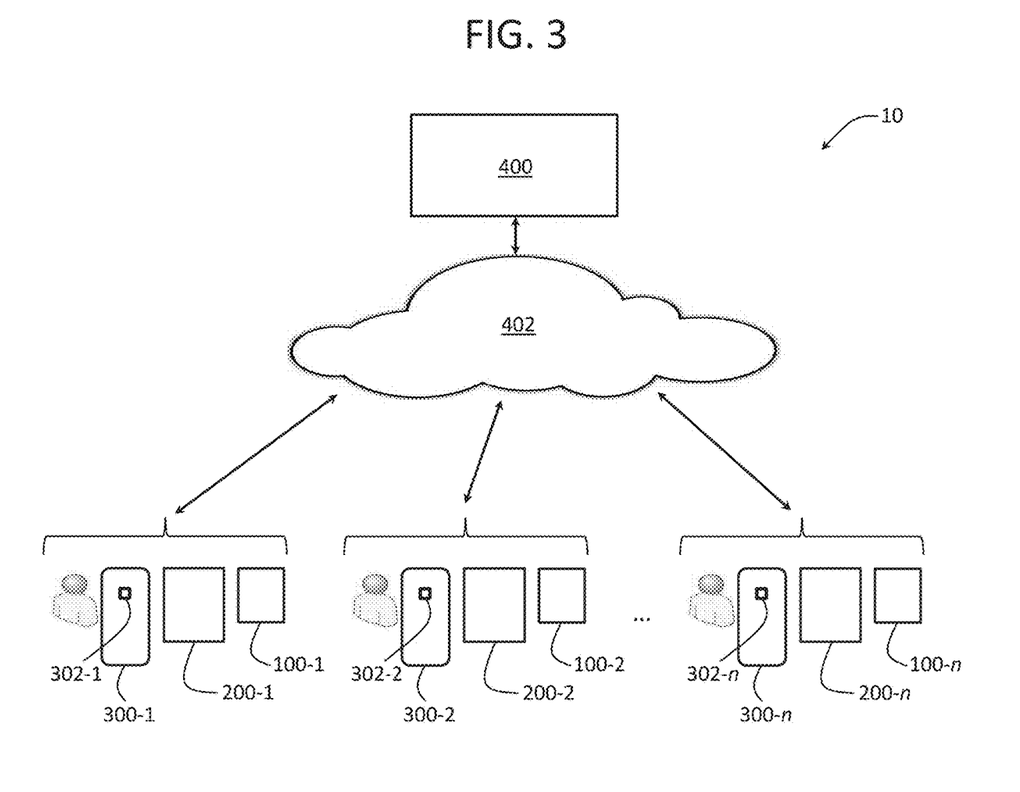
FIGS. 3-4 show aspects of a device control system according to exemplary embodiments hereof.
Figure 4:
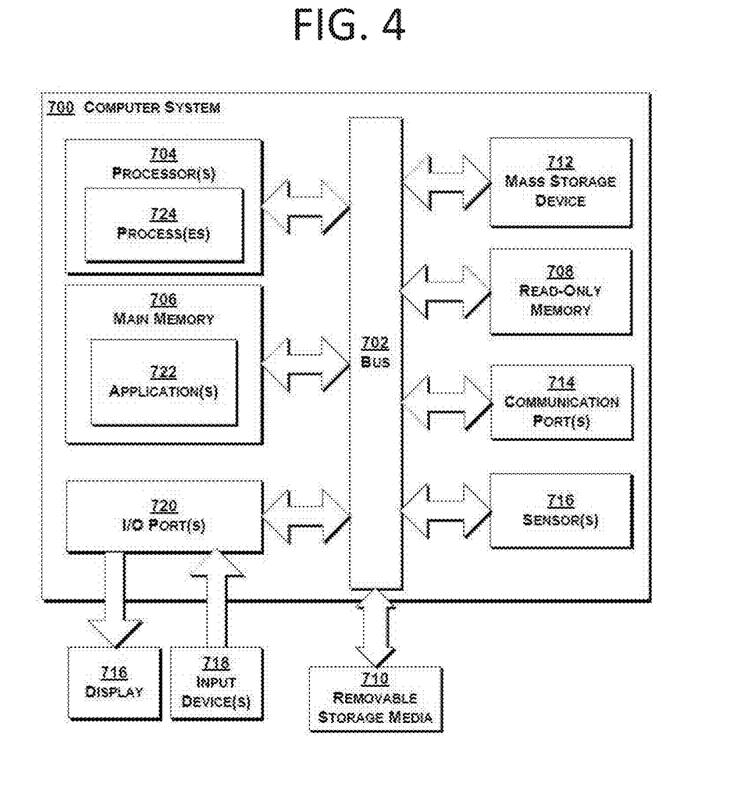

In one exemplary embodiment hereof as shown in FIG. 3, the system 10 may include a control platform 400 (also referred to as a cloud platform and/or a backend system or platform) that may be in communication with the onboard computer 100, the HOS system 200, the mobile app 300 or with any other element or component of the system 10 as required by the system 10. In this way, the safety protocols or other settings of the system 10 may be communicated (e.g., updated) from the control platform 400 to the onboard computer 100, the HOS system 200 or the mobile app 300. Data may also be communicated from the onboard computer 100, the HOS system 200 and/or the mobile app 300 to the control platform 400, or between any of the components, elements or systems 100, 200, 300, 400 or any combination thereof. This may allow the safety protocols or other settings of the system 10 to be updated from the control platform 400 to the onboard computer 100, the HOS system or the mobile app 300 in real time. For example, if the system 10 recognizes adverse weather conditions in the area of the particular vehicle 12, the system 10 may update the safety protocols in the onboard computer 100, the HOS system 200 and/or the mobile app 300 configured with the particular vehicle 12 to further restrict the functionality of the driver's mobile device 302.

The cloud platform 104 may include one or more servers (such as Internet servers) and may include all of the components (hardware and software) necessary to transmit and receive data to and from the onboard computer 100, the HOS system 200 and/or the mobile app 300, and to analyze or otherwise process the data it may receive and/or transmit. For example, the cloud platform 400 may include a CPU, microprocessor, microcontroller, chipset, control board, RAM, general memory, network boards, power supplies, an operating system, software, applications, scripts and any other component, application, mechanism, device or software as required. The cloud platform 400 may generally receive data transmitted by the onboard computer 100, the HOS system 200 and/or the mobile app 300, analyze and/or process the data, and transmit information, commands or other types of data back to the onboard computer 100, the HOS system 200 and/or the mobile app 300. The cloud platform 400 may communicate with the other elements 100, 200, 300 of the system 10 through a network 402 such as an Internet connection (e.g. via a cellular service provider), through satellite communications or by other means.

The cloud server 400 may receive vehicle and/or driver data from each element 100, 200, 300, may store the data in a database or in other types of data filing architectures within its memory, and may analyze the data according to defined protocols. The cloud platform 400 may also download the data to another platform or facility where the data may be stored, analyzed or otherwise evaluated, compared to the criteria of each particular vehicle and/or generally processed. In this way the system 10 may determine if and when particular safety protocols may need to be updated with any particular system 10.

As shown in FIG. 3, the cloud platform 400 may receive and transmit data to one or more onboard computer 100-1, 100-2, . . . 100-n, one or more HOS system 200-1, 200-2, . . . 200-n and/or one or more mobile app 300-1, 300-2, . . . 300-n in different vehicles 12 simultaneously and in real time. In this way, a multitude of vehicles 12 configured with the system 10 may be monitored and controlled in real time by one or more cloud platforms 400. It may be preferable that each vehicle 12, onboard computer 100, HOS system 200 and/or mobile app 300 have a unique identifier (such as a serial number, IP address or other type of unique identifier) and that the platform 400 may recognize each unique identifier and communicate with each vehicle 12, onboard computer 100, HOS system 200 and/or mobile app 300 individually.

In one exemplary embodiment hereof, the HOS system 200 may make the determination of whether particular functionalities of the mobile phone 302 should be restricted. In this case, the HOS system 200 may include the safety protocols described above and may utilize the vehicle data that it may receive from the onboard computer 100 to make the determinations. For example, the HOS system 200 may receive information from the onboard computer 100 that the vehicle is in motion and at a particular road speed, and it may accordingly instruct the mobile phone 302 to systematically restrict particular functionalities to result in the same desired outcomes as described in the section above with reference to the mobile app 300 making the determinations.

In this example, the active driver may use his/her mobile device 302 as a security key to log into the HOS system 200. The driver may use the mobile app 300 on the device 302 to make connection with and log into the HOS system 200. For team driving, if a second driver (the inactive driver) is also present in the vehicle 12, the inactive driver's device 302 may be added and logged into the system 200. Once the vehicle 12 begins to move, the HOS system 200 may sense the movement (via communication with the onboard computer 100) and the HOS system 200 may immobilize particular functionalities on the driver's phone as describe above.

In the scenarios described above regarding the app 300 making the restriction determinations and/or the HOS system 200 making the restriction determinations, it may be preferable for the phone 302 to be logged onto, paired, synched or otherwise connected to the HOS system 200 continuously from the beginning of the drive to the end of the drive such that the system 10 may continuously monitor the vehicle's aspects, characteristics and/or conditions in real time and implement the desired mobile phone 302 restrictions without interruption. This log-on process, synching, connecting, pairing, etc. of the HOS system 200 and the mobile phone 302 may be a manual process that the driver may perform upon entering the vehicle in preparation for the drive, or it may be an automatic process that may be performed automatically by the HOS system 200 and the mobile phone 302 when the mobile phone 302 is identified to have been brought into the vehicle or powered up within the vehicle.

In one exemplary embodiment hereof, the HOS system 200 may disable the vehicle 12 from being operated if the mobile phone 302 is identified to be powered up and within the vehicle 12 but not properly synced or connected to the HOS system 200. This may be accomplished through the communication of the HOS system 200 and the onboard computer 100 or by other means. It may also be preferable that the mobile app 300 include the ability to lock or otherwise disallow it from being disengaged, stopped, turned off or otherwise disabled during the duration of the time that it may be logged onto or otherwise paired or in communication with the HOS system 200. In this way, system 10 may ensure that it has partial or complete control of the mobile device 302 while the device 302 is in the vehicle 12 and that the deemed unsafe functionality of the phone 302 may be reliably restricted and unavailable for use during this time.

It should be noted that the system 10 may also include a hybrid of the scenarios described above where both the HOS system 200 and the mobile app 300 may each make determinations regarding the status of the vehicle 12 and the appropriate mobile phone functionality restrictions. In this scenario, the HOS system 200 may include a set of safety protocols and the mobile app 300 may include the same or different set of safety protocols. In the case where both have safety protocols that are different for the same vehicle conditions, either the HOS system 200 or the mobile app 300 may or may not have priority over the other depending on the specific vehicle status, the type of phone functionality in question and other conditions.

In one exemplary embodiment hereof, specific functionalities of the mobile phone 302 may be mirrored on the interface or front touch screen 202 of the HOS system 200. That is, with HOS system 200 paired with mobile phone 302, certain functionalities of the mobile phone 302 may be available and controlled through interaction with touch screen 202 of HOS system 200. For example, app icon 304 on mobile phone 302 may be mirrored on the touch screen 202 of the HOS system 200 and be represented as app icon 204 in FIG. 1. Similarly, app icon 306 may be mirrored on touch screen 202 as app icon 206.

In this example, the user may touch app icon 206 on touch screen 202 to launch the voice calling functionality of mobile phone 302. The voice calling interface, such as the call button, favorite contact list, numerical keypad, etc., which would normally only reside on the mobile phone 302 may also appear on the touch screen 202 for the user to utilize. In this way, the user may place a call using the touch screen 202 of the HOS system 200 instead of using the mobile phone 302. In another example, an incoming call may appear on touch screen 202 in addition to or instead of on the mobile phone 302 and the user may answer the call by interacting with touch screen 202. Accordingly, it may not be required for the user to interact with the mobile phone 302 for a variety of mobile phone functionalities that may also or instead be available on touch screen 202. It may be preferable that touch screen 202 be placed in a position that the driver of vehicle 12 may interact with the touch screen 202 without taking his/her eyes off the road. For example, touch screen 202 may be positioned in front of the dashboard next to the steering wheel or in other safe locations. In this way, the driver's interaction with touch screen 202 may be a safer way to utilize specific functionalities of mobile phone 302 compared to handling the phone 302 which may require the driver to move his/her hand and/or look away from the road.

It should be noted that in this scenario, system 10 may continue to monitor the status of the vehicle 12 in order to determine proper restrictions on functionalities of mobile device 302 as described above. However, if it is deemed that at particular functionality is safe to use and therefore not restricted, its use may occur through interaction with the touch screen 202 instead of the mobile device 302. In one example of this, if the vehicle is moving but system 10 identifies that the user has a hands-free device in operation to take incoming voice calls, when an incoming voice call may be received, it may appear on the touch screen 202 for the driver to interact with and answer. Because this may not require the driver to take his/her eyes off the road to answer and take the call, the activity may be deemed safe and therefore not restricted. However, if the driver does not have a hands-free device in operation, the system 10 may deem an incoming call as an unsafe activity and may restrict the functionality and send the call directly to voice mail.

Figure 2:
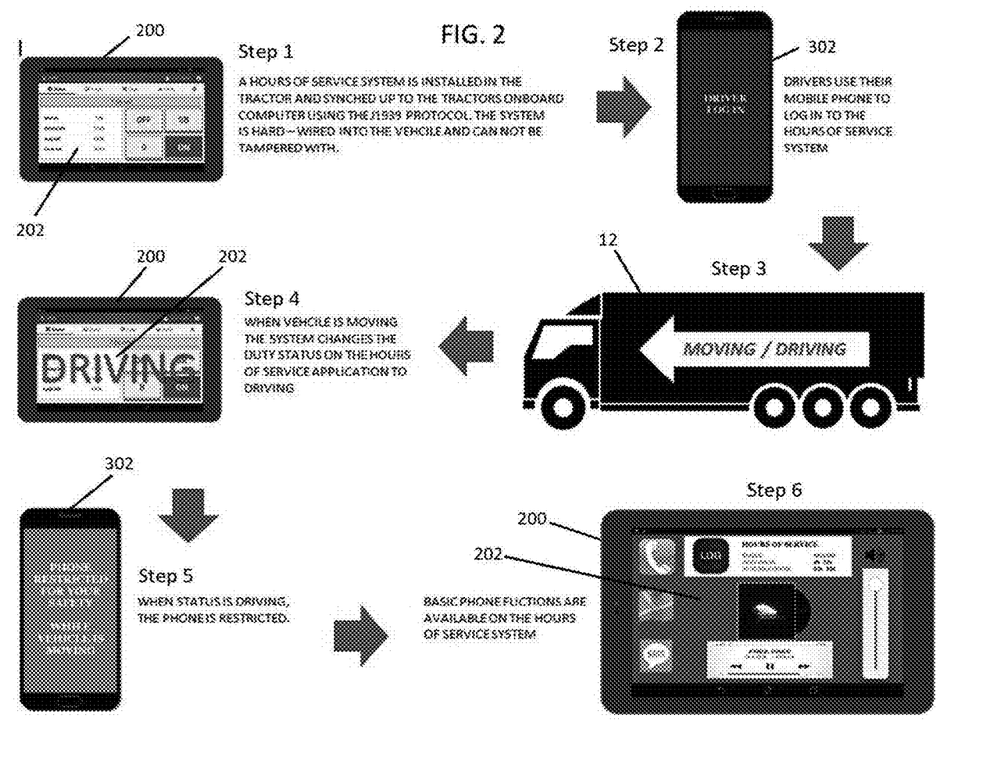
FIG. 2 shows steps taken by a device control system according to exemplary embodiments hereof.

A basic workflow of system 10 is shown FIG. 2. As shown, Step 1 may be installing the HOS system 200 into the vehicle 12 and synching it with the vehicle's onboard computer system 100. Step 2 may then be to pair the mobile phone 302 with the HOS system 200 by manual log-in or by automatic synching, and activating the mobile app 300. Once the vehicle begins to move as depicted in Step 3, the system 10 may identify the movement and set the HOS system 200 to "Driving Mode" as shown in Step 4. This may result in the system 10 restricting specific apps and functionalities on the mobile device 302 as shown in Step 5 and as described above. Then, in Step 6, the functionality of mobile phone 302 may be mirrored on the touch screen 202 of the HOS system 200 so that the user may interact with the touch screen 202 to utilize any mobile device apps or functionality that may not be restricted.

In one exemplary embodiment hereof, the system 10 may not require the HOS system 200 to communicate with the vehicle's onboard computer 100 in order to ascertain if the vehicle 12 is moving or being driven, but may instead rely on the mobile phone 302 to ascertain this information. This may be accomplished by utilizing the mobile phone's internal accelerometer 308 or other type of sensor integrated within or otherwise configured with the mobile phone 302 that may have the ability to sense movement. In this case, the mobile device 302 may ascertain the status of the vehicle (for example, if the vehicle is being driven at a particular speed) and may use this information to make restrictions on its various functionalities as described above. In addition, the mobile phone 302 may communicate the information regarding the vehicle's movement or speed to the HOS system 200 and the HOS system 200 may make the determination regarding unsafe mobile phone 302 functionalities and may perform the resulting restrictions as described above sections. It can be seen that in these scenarios, system 10 may not need to communicate with the onboard computer 100 to ascertain movement of the vehicle 12, and may still perform the appropriate restrictions on the mobile device 302. In addition, it can be seen that the mobile app 300 may not need to be programmed or otherwise designed or configured to receive any vehicle status information from the HOS system 200 since mobile app 300 with mobile phone 302 may ascertain the vehicle status itself. This may reduce the cost and complexity of system 10.

It may be preferable that the system 10 may still require that the mobile app 300 (and mobile phone 302) be paired or otherwise connected to or logged-in to the HOS system 200 continuously during use of the vehicle 12 and that if this is not the case, the HOS system 200 may disable the usage of vehicle 12. In this way, the system 10 may ensure that mobile app 300 may continuously control the mobile phone 302 in order to impose the applicable restrictions. It may also be preferable that the driver be unable to disabled the system 10 (e.g., the mobile app 300) without parking the vehicle 12 or otherwise stopping operation of the vehicle 12. Note that all of the descriptions, information and workings of system 10 described in prior sections of this specification also apply to this scenario as well. For example, the mirroring functionality for applications on the mobile device 302 that allow the same applications to be available on the interface 202 of the HOS system 200 is also included in this scenario.

Additional functionality of system 10 may include the ability to monitor the driver's driving activities and/or habits, and report any data or events that may take place that are deemed unsafe to an authority figure such as the management of the fleet of transportation vehicles, to the parents of the driver, etc. For example, if the driver is continually driving at a speed that is higher than the speed limit, this information may be logged and relayed to the fleet management for review. This information may then be used to edit the safety protocols within the HOS system 200 and/or the mobile app 300 in real time to further restrict the usage of the mobile phone 302 as warranted.

Computing

The applications, services, mechanisms, operations, and acts shown and described above are implemented, at least in part, by software running on one or more computers.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

FIG. 7 is a schematic diagram of a computer system 700 upon which embodiments of the present disclosure may be implemented and carried out.

According to the present example, the computer system 700 includes a bus 702 (i.e., interconnect), one or more processors 704, a main memory 706, read-only memory 708, removable storage media 710, mass storage 712, and one or more communications ports 714. Communication port(s) 714 may be connected to one or more networks (not shown) by way of which the computer system 700 may receive and/or transmit data.

As used herein, a "processor" means one or more microprocessors, central processing Units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 704 can be any known processor, such as, but not limited to, an Intel® Itanium® or Itanium 2® processor (s), AMD® Opteron® or Athlon MP® processor(s), or Motorola® lines of processors, and the like. Communications port(s) 714 can be any of an Ethernet port, a Gigabit port using copper or fiber, or a USB port, and the like. Communications port(s) 714 may be chosen depending on a network such as a Local Area Network (LAN), a Wide Area Network (WAN), or any network to which the computer system 700 connects. The computer system 700 may be in communication with peripheral devices (e.g., display screen 716, input device(s) 718) via Input/Output (I/O) port 720.

Main memory 706 can be Random Access Memory (RAM), or any other dynamic storage device(s) commonly known in the art. Read-only memory (ROM) 708 can be any static storage device(s) such as Programmable Read-Only Memory (PROM) chips for storing static information such as instructions for processor(s) 704. Mass storage 712 can be used to store information and instructions. For example, hard disk drives, an optical disc, an array of disks such as Redundant Array of Independent Disks (RAID), or any other mass storage devices may be used.

Bus 702 communicatively couples processor(s) 704 with the other memory, storage and communications blocks. Bus 702 can be a PCI/PCI-X, SCSI, a Universal Serial Bus (USB) based system bus (or other) depending on the storage devices used, and the like. Removable storage media 710 can be any kind of external storage, including hard-drives, floppy drives, USB drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 706 is encoded with application(s) 722 that support(s) the functionality as discussed herein (the application(s) 722 may be an application(s) that provides some or all of the functionality of the services/mechanisms described herein). Application(s) 722 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 704 accesses main memory 706 via the use of bus 702 in order to launch, run, execute, interpret or otherwise perform the logic instructions of the application(s) 722. Execution of application(s) 722 produces processing functionality of the service related to the application(s). In other words, the process(es) 724 represent one or more portions of the application(s) 722 performing within or upon the processor(s) 704 in the computer system 700.

It should be noted that, in addition to the process(es) 724 that carries(carry) out operations as discussed herein, other embodiments herein include the application 722 itself (i.e., the Un-executed or non-performing logic instructions and/or data). The application 722 may be stored on a computer readable medium (e.g., a repository) such as a disk or in an optical medium. According to other embodiments, the application 722 can also be stored in a memory type system such as in firmware, read only memory (ROM), or, as in this example, as executable code within the main memory 706 (e.g., within Random Access Memory or RAM). For example, application(s) 722 may also be stored in removable storage media 710, read-only memory 708, and/or mass storage device 712.

Those skilled in the art will understand that the computer system 700 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and Understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be Understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used herein, including in the claims, the term "portion" means some or all. So, for example, "A portion of X" may include some of "X" or all of "X". In the context of a conversation, the term "portion" means some or all of the conversation.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, Unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

As used herein, including in the claims, the term "automatic," with respect to an action, generally means that the action occurs with little or no human control or interaction. The term "automatic" also includes the case of no human control or interaction. Thus, e.g., the term "triggered automatically" means "triggered with little or no human control or interaction," and includes the case "triggered with no human control or interaction."

As used herein, including in the claims, singular forms of terms are to be construed as also including the plural form and vice versa, Unless the context indicates otherwise. Thus, it should be noted that as used herein, the singular forms "a," "an," and "the" include plural references Unless the context clearly dictates otherwise.

Throughout the description and claims, the terms "comprise", "including", "having", and "contain" and their variations should be Understood as meaning "including but not limited to", and are not intended to exclude other components Unless specifically so stated.

It will be appreciated that variations to the embodiments of the invention can be made while still falling within the scope of the invention. Alternative features serving the same, equivalent or similar purpose can replace features disclosed in the specification, Unless stated otherwise. Thus, Unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.") and the like, is merely intended to better illustrate the invention and does not indicate a limitation on the scope of the invention Unless specifically so claimed.

Any acts described in the specification may be performed in any order or simultaneously, Unless the context clearly indicates otherwise.

All of the features and/or acts disclosed herein can be combined in any combination, except for combinations where at least some of the features and/or acts are mutually exclusive. In particular, preferred features of the invention are applicable to all aspects of the invention and may be used in any combination.

It should be appreciated that the words "first" and "second" in the description and claims are used to distinguish or identify, and not to show a serial or numerical limitation. Similarly, the use of letter or numerical labels (such as "(A)", "(B)", "(B)(1)" and the like) are used to help distinguish and/or identify, and not to show any serial or numerical limitation or ordering.

No ordering is implied by any of the labeled boxes in any of the flow diagrams Unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be Understood that the invention is not to be limited to the disclosed embodiment, but on the contrary, is intended to cover various modifications and equivalent arrangements included within the spirit and scope of the appended claims.

Although certain presently preferred embodiments of the invention have been described herein, it will be apparent to those skilled in the art to which the invention pertains that variations and modifications of the described embodiments may be made without departing from the spirit and scope of the invention.

What is claimed is:

1. A system for controlling an electronic device, the electronic device located within a vehicle and including a first display and a first application, the vehicle including a first monitoring device adapted to monitor a status of the vehicle, the system comprising:
   a second application installed on the electronic device;
   a second monitoring device within the vehicle and including a second display, and adapted to receive vehicle status information from the first monitoring device;
   the second application adapted to receive information based at least in part on the vehicle status information from the second monitoring device;
   wherein, based at least in part on the information received from the second monitoring device, the second application determines to disable the first application; and
   wherein the second display is adapted to mirror at least a portion of the first display.

2. The system of claim 1 wherein the second application includes protocol information for determining to disable the first application based on the vehicle status information.

3. The system of claim 1 wherein the electronic device is a smartphone or a tablet computer.

4. The system of claim 1 wherein the second monitoring device includes an hours of service (HOS) system.

5. The system of claim 1 further comprising a backend system.

6. The system of claim 5 wherein the backend system includes:
   (A) at least one database; and
   wherein the backend system maintains in said at least one database, protocol information for determining to disable the first application based on the vehicle status information.

7. The system of claim 6 wherein the backend system communicates the protocol information to the second application, and the second application determines to disable the first application based on the protocol information.

8. The system of claim 1 wherein the second display is adapted to provide access to at least a portion of the first display.

9. The system of claim 1 wherein the second display is adapted to mirror and provide access to the first application.

10. A method for controlling an electronic device located within a vehicle, the electronic device including a first application and a first display, the vehicle including a first monitoring device adapted to monitor a status of the vehicle, the method comprising:
    (A) configuring the electronic device with a second application;
    (B) obtaining the status of the vehicle using the first monitoring device;
    (C) providing information based at least in part on the vehicle status obtained in (B) to a second monitoring device within the vehicle, the second monitoring device including a second display;
    (D) using the second monitoring device to provide at least some of the information received in (C) to the second application;
    (E) using the second application to determine, based at least in part on the information received in (D), to disable the first application; and
    (F) mirroring at least a portion of the first display onto the second display.

11. The method of claim 10 wherein the electronic device is a smartphone or a tablet computer, and the second monitoring device includes an hours of service (HOS) system.

12. The method of claim 10 wherein the vehicle status information obtained in (B) includes the vehicle's speed, the vehicle's location or the vehicle's driver.

13. The method of claim 10 wherein the first application includes functionalities for texting, voice calling, or using an Internet browser.

14. The method of 10 further comprising, after step (C):
    (C)(1) determining if the electronic device is within a cabin of the vehicle.

15. The method of claim 14 wherein the determination made in (D) is based at least in part on the determination made in (C)(1).

16. The method of claim 10 wherein the second application includes protocol information for determining to disable the first application based on the vehicle status information.

17. A system for disabling a first application on an electronic device including a first display and located within a vehicle, the vehicle including a first monitoring device adapted to monitor a status of the vehicle, the system comprising:
- a second monitoring device within the vehicle and including a second display, and adapted to receive vehicle status information from the first monitoring device;
- a second application installed on the electronic device, the second application adapted to receive information based at least in part on the vehicle status information from the second monitoring device;
- wherein, based at least in part on the vehicle status information, the second monitoring device and/or the second application determines to disable the first application; and
- wherein the second display is adapted to mirror at least a portion of the first display.

18. The system of claim 17 wherein the vehicle status information indicates whether or not the vehicle is moving.

19. The system of claim 17 wherein the electronic device is a smartphone or a tablet computer, and the second monitoring device includes an hours of service (HOS) system.

20. The system of claim 17 further comprising a backend system including at least one database, wherein the backend system maintains in said at least one database, protocol information for determining to disable the first application based on the vehicle status information.

* * * * *